United States Patent
Ezekiel et al.

(10) Patent No.: US 8,170,279 B2
(45) Date of Patent: May 1, 2012

(54) ADAPTIVE MATCH METRIC SELECTION FOR AUTOMATIC TARGET RECOGNITION

(75) Inventors: Albert Ezekiel, Los Angeles, CA (US); Brent McCleary, Chino Hills, CA (US)

(73) Assignee: Raytheon Company, Waltham, MA (US)

( * ) Notice: Subject to any disclaimer, the term of this patent is extended or adjusted under 35 U.S.C. 154(b) by 982 days.

(21) Appl. No.: 12/214,833

(22) Filed: Jun. 23, 2008

(65) Prior Publication Data

US 2009/0316953 A1    Dec. 24, 2009

(51) Int. Cl.
*G06K 9/00* (2006.01)
(52) U.S. Cl. .......................... 382/103; 342/90
(58) Field of Classification Search .................. 382/103, 382/215, 218; 342/25 R, 25 A, 25 B, 90
See application file for complete search history.

(56) References Cited

U.S. PATENT DOCUMENTS

| | | | |
|---|---|---|---|
| 6,259,396 B1 * | 7/2001 | Pham et al. ...................... | 342/90 |
| 6,756,934 B1 | 6/2004 | Chen et al. ...................... | 342/89 |
| 2002/0051565 A1 * | 5/2002 | Hiroi et al. ..................... | 382/149 |
| 2007/0036400 A1 | 2/2007 | Watanabe et al. ............. | 382/124 |

OTHER PUBLICATIONS

European Search Report for European Application No. 09251624.4, Applicant Raytheon Company, European Search Report dated Oct. 16, 2009 and mailed Oct. 26, 2009 (7 pgs.).
Saghri, J.A. and Cary, D.A., "A Rectangular-Fit Classifier for Synthetic Aperture Radar Automatic Target Recognition", Proc. SPIEE, vol. 6696, 2007, pp. 66961B-1-66961B-11.

* cited by examiner

*Primary Examiner* — Andrew W Johns
(74) *Attorney, Agent, or Firm* — Christie, Parker & Hale, LLP

(57) ABSTRACT

An automatic target recognition system with adaptive metric selection. The novel system includes an adaptive metric selector for selecting a match metric based on the presence or absence of a particular feature in an image and a matcher for identifying a target in the image using the selected match metric. In an illustrative embodiment, the adaptive metric selector is designed to detect a shadow in the image and select a first metric if a shadow is detected and not cut off, and select a second metric otherwise. The system may also include an automatic target cuer for detecting targets in a full-scene image and outputting one or more target chips, each chip containing one target. The adaptive metric selector adaptively selects the match metric for each chip separately, and may also adaptively select an appropriate chip size such that a shadow in the chip is not unnecessarily cut off.

12 Claims, 4 Drawing Sheets

ADAPTIVE MATCH METRIC SELECTION FOR AUTOMATIC TARGET RECOGNITION

BACKGROUND OF THE INVENTION

1. Field of the Invention

The present invention relates to image processing. More specifically, the present invention relates to automatic target recognition.

2. Description of the Related Art

Radar target detection and identification has been useful in many applications such as military surveillance, reconnaissance, and combat missions. The detection and identification of targets can provide real-time assessment of the number and locations of the targets, or objects of interest. One method of target detection and identification involves acquiring an image of a target scene using synthetic aperture radar (SAR) and then processing the image to extract the features of any targets and match the features to a database for identification.

Synthetic aperture radar systems acquire an image of a scene by coherently combining return signals from a plurality of sequentially transmitted radar pulses from a relatively small radar antenna on a moving platform. The plurality of returns generated by the transmitted pulses along the known path of the platform make up an array length. Across the array length, the amplitude and phase information returned from each of the pulses for each of several range bins is preserved, forming a SAR image having an image quality comparable to that obtained by a larger antenna (corresponding approximately to the synthetic length traveled by the antenna during the acquisition of the image).

An automatic target recognition (ATR) system processes a SAR image to detect and identify targets in the image. An ATR system typically includes an automatic target cuer (ATC) and a matcher. The ATC processes the SAR image to detect targets of interest, obtaining the location, length, width, and orientation of targets in the image. Target chips, which are small portions of the original SAR image, where each chip typically contains one target, are then sent to the matcher for identification. The matcher processes each target chip and compares it to various target classes in a stored database to identify the target.

Several matcher algorithms, including the algorithm used by the Real-Time Moving and Stationary Target Acquisition and Recognition (RT-MSTAR) system, use model-based target recognition to identify targets. Model-based recognition typically uses models of the targets to synthesize expected SAR images for each target class under a variety of viewing conditions (such as target orientation relative to the radar) and then searches for the target type/orientation combination that maximizes some match metric between the synthesized image and the observed image. These types of systems perform relatively well and are particularly robust with respect to target orientation and viewing conditions. However, these systems still generate false alarm rates (incorrect identifications) that can be higher than desirable if not used in an optimal manner.

Hence, a need exists in the art for an improved automatic target recognition system that is more accurate than prior approaches.

SUMMARY OF THE INVENTION

The need in the art is addressed by the automatic target recognition system with adaptive metric selection detailed in the present invention. The novel system includes an adaptive metric selector for selecting a match metric based on the presence or absence of a particular feature in an image and a matcher for identifying a target in the image using the selected match metric. In an illustrative embodiment, the adaptive metric selector is adapted to detect a shadow in the image and select a first metric if a shadow is detected and not cut off, and select a second metric otherwise. The system may also include an automatic target cuer for detecting targets in a full-scene image and outputting one or more target chips, each chip containing one target. The adaptive metric selector selects the match metric for each chip separately, and may also be adapted to select an appropriate chip size for each target chip such that a shadow in the chip is not unnecessarily cut off.

BRIEF DESCRIPTION OF THE DRAWINGS

FIG. 4b is a diagram of an illustrative elongated target chip designed in accordance with an illustrative embodiment of the present teachings, corresponding to the imaging geometry shown in FIG. 4a.

DESCRIPTION OF THE INVENTION

Figure 1:
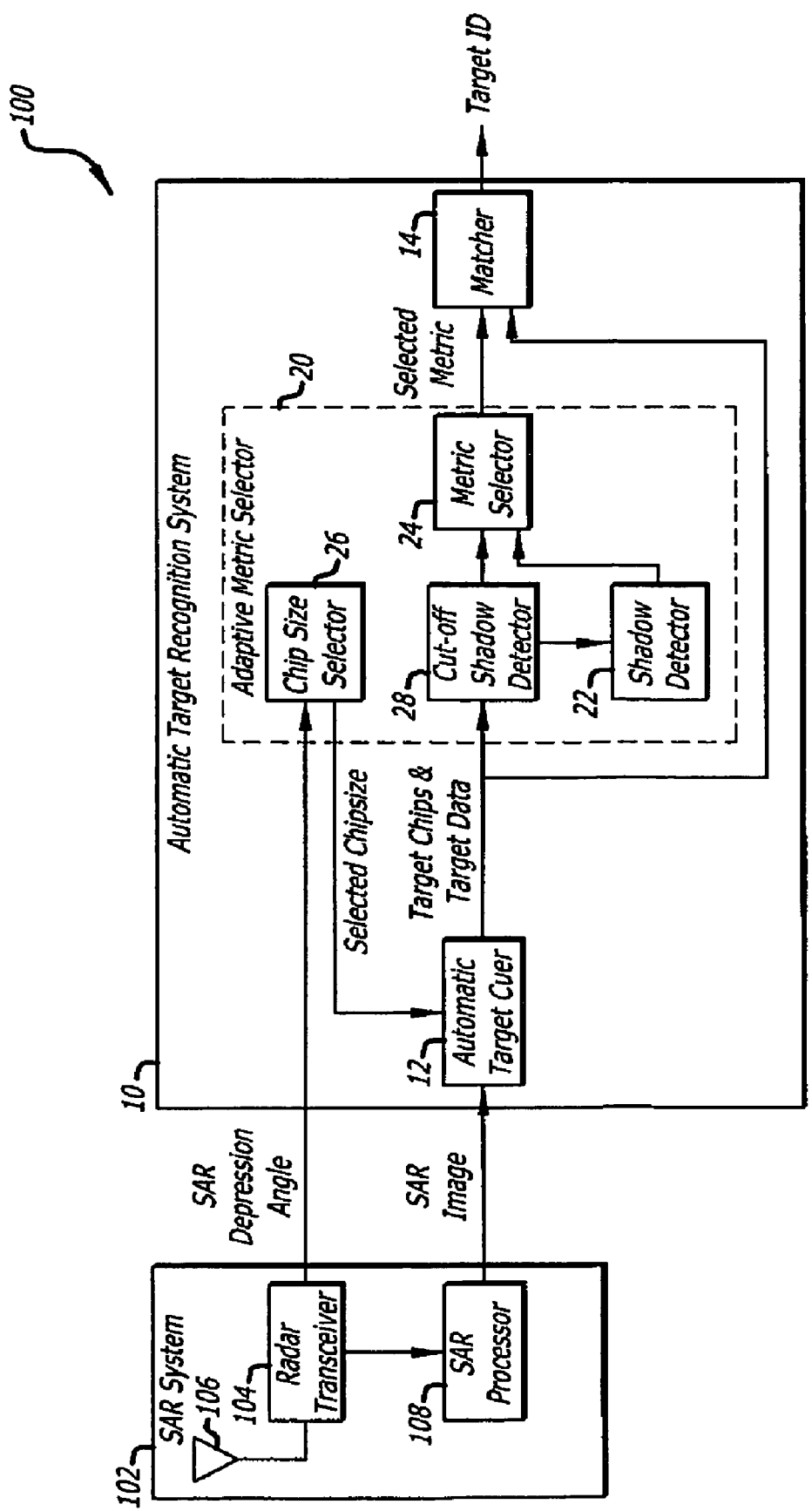
FIG. 1 is a simplified block diagram of an automatic target recognition system designed in accordance with an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Several different match metrics may be used by an automatic target recognition (ATR) system to score how well a target in an observed image matches a target class in a system database. Certain ATR systems select which match metric to use depending on the radar geometry used to obtain the observed image. For example, the ATR algorithm used by the RT-MSTAR system makes a target identification based primarily on one of two metrics: relative amplitude or classification level test statistic (CLTS). Currently, the choice of which metric to select is made a priori, based on the radar depression (or grazing) angle. If the SAR imaging system uses a depression angle less than a predetermined amount (e.g., 13 degrees), then the relative amplitude metric is selected; otherwise, the CLTS metric is selected. The metric selection criterion is therefore based entirely on imaging geometry, not on scene content.

In accordance with the teachings of the present invention, ATR performance can be improved if the match metric is adaptively selected based on what features are present in the acquired image, instead of on the radar imaging geometry as currently employed. In an illustrative embodiment, the present invention selects the match metric based on whether or not a shadow is present in the observed image.

For a relatively tall target on the ground, certain range bins of the SAR image will be obscured because the target's height will create a shadow from the radar energy emitted by the radar antenna. Thus, no radar energy will be returned from those range bins in the shadow of the target. This shadow, present in certain range bins, may indicate features of the target casting the shadow.

ATR systems typically produce better target identifications when shadow information is used. However, if shadows are not present in the image and the matching algorithm expects shadows, identification performance may deteriorate significantly. Analysis shows that ATR performance of the RT-MSTAR system may degrade substantially if the ATR system uses the CLTS metric for matching when there is no shadow in the SAR image. Conversely, when the relative amplitude metric is chosen and there is a shadow in the SAR image, ATR performance degrades slightly. To maximize performance, the present invention automatically selects which match metric to use based on the presence or absence of target shadows in the SAR image, regardless of SAR depression angle. Instead of making an a prior selection of match metric, the present invention makes an adaptive selection of metric on a target-to-target image chip basis.

FIG. 1 is a simplified block diagram of a SAR automatic target recognition system 100 designed in accordance with an illustrative embodiment of the present invention. The system 100 includes a SAR system 102 that acquires a SAR image and a novel automatic target recognition (ATR) system 10 that identifies targets in the image. The illustrative SAR system 102 includes a radar transceiver 104 coupled to an antenna 106 that transmits a plurality of radar pulses toward a target scene and receives the resulting radar return signals. A SAR processor 108 then combines the information in the radar returns to form an image of the target scene.

The ATR system 10 receives the SAR image, as well as other information from the SAR system 102 such as the radar depression angle and SAR image pixel spacing, and identifies targets in the image. The illustrative ATR system 10 includes an automatic target cuer (ATC) 12 that detects targets in the SAR image and a matcher 14 that identifies the detected targets. In accordance with the present teachings, the ATR system 10 also includes a novel adaptive metric selector 20 that selects which metric the matcher 14 should use based on the presence or absence of shadows in the image.

The ATC 12 takes the SAR acquired image and searches for targets of interest. A full-scene SAR image typically includes several targets. The ATC 12 determines the locations of the targets in the image and outputs target chips (which are small, cropped portions of the full image, each chip ideally including only one target and the region immediately surrounding it, including the target shadow, if present). The ATC 12 may also extract additional information about each target, such as its length, width, height, and orientation. Several ATC algorithms are known in the art. See, for example, U.S. Pat. No. 6,259,396, entitled "Target Acquisition System and Radon Transform Based Method for Target Azimuth Aspect Estimation" issued Jul. 10, 2001 to A. H. Pham and A. Ezekiel, the teachings of which are incorporated herein by reference.

The matcher 14 processes each target chip, computing a particular match metric between the target chip and several predetermined target classes and classifying the target as the target class having the highest match metric score. In an illustrative embodiment, the matcher 14 uses a model-based algorithm such as the RT-MSTAR matcher algorithm and computes either the relative amplitude or CLTS metric. For a description of an example matcher algorithm that may be used with the present invention, see for example, "Real Time Model Based Automatic Recognition" by M. Burke and G. Ettinger in Proceedings of Combat Identification Systems Conference, Colorado Springs, Colo., Jun. 3-7, 2002.

In accordance with the teachings of the present invention, the match metric used by the matcher 14 is selected by a novel adaptive metric selector 20, which chooses the metric based on the presence or absence of a shadow in the target chip. In an illustrative embodiment, the adaptive metric selector 20 includes a shadow detector 22 and a metric selector 24.

The shadow detector 22 processes each target chip and determines whether or not a target shadow is present in the chip. In a preferred embodiment, the shadow detector 22 uses the shadow detection algorithm described in U.S. Pat. No. 6,756,934, entitled "Target Shadow Detector for Synthetic Aperture Radar" issued Jun. 29, 2004 to J. C. Chen and A. Ezekiel, the teachings of which are incorporated herein by reference. Other shadow detection algorithms may also be used without departing from the scope of the present teachings.

The metric selector 24 receives the results from the shadow detector 22 and in accordance therewith, generates a control signal indicating which match metric the matcher 14 should use. In an illustrative embodiment, if the shadow detector 22 indicates that a target shadow is present in the target chip, then the metric selector 24 chooses the CLTS metric. If the shadow detector 22 indicates that a target shadow is not present in the target chip, then the metric selector 24 chooses the relative amplitude metric.

The adaptive metric selector 20 may also includes a subroutine 26 for selecting the size of the target chips. In conventional ATR systems, the target chips are typically a fixed size, such as 128×128 pixels, for example. A small chip size is usually preferred in order to isolate individual targets as well as to reduce the processing time of the typically computation-intensive ATR matcher. In certain conditions such as low depression angles, however, this may result in a cut-off target shadow (i.e., the entire shadow is not included in the target chip even though the entire shadow is available in the full-scene image), taking away valuable shadow information that may be used to help identify the target 32. The entire shadow should be included in the target chip for optimal ATR performance.

Figure 2:
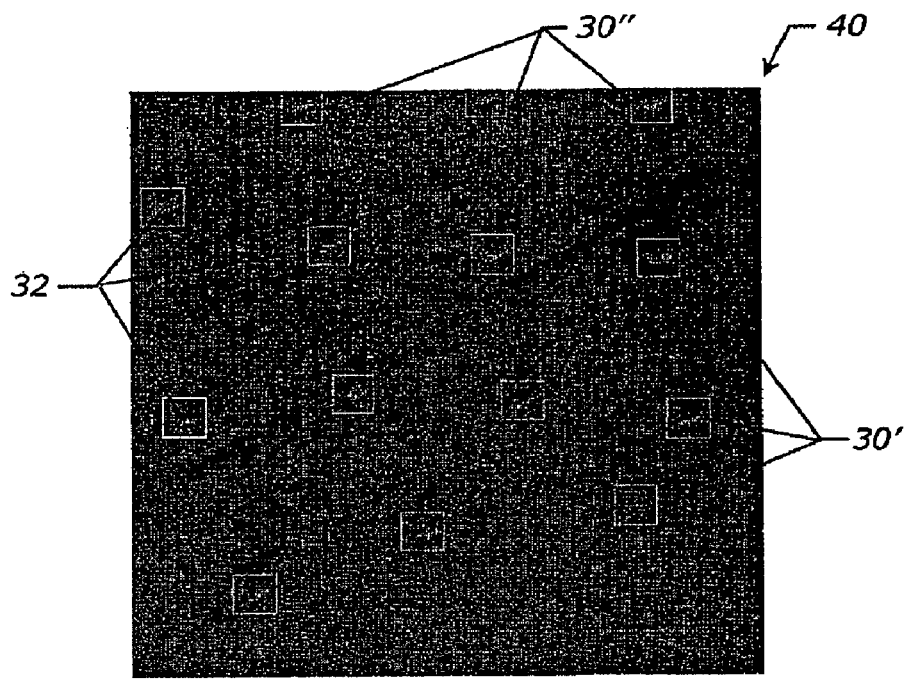
FIG. 2 is an example full-scene SAR image having several detected targets that are isolated in individual target chips.

FIG. 2 is an example full-scene SAR image 40 having several detected targets 32 that are isolated in individual target chips 30'. In this example, the SAR system acquired the image 40 using a depression angle of 10 degrees and the target chips 30' are a conventional square shape, resulting in cut-off target shadows in the target chips 30' even though the entire shadows may be available in the full-scene image 40.

Figure 3A:
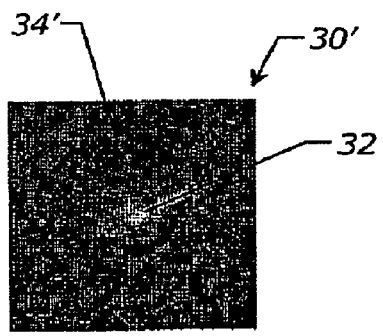
FIG. 3a is an example target chip with a conventional square shape.

FIG. 3a is an example target chip 30' with a conventional square shape. The example target chip 30' is a 128×128 pixel square, centered on the target 32. If the target 32 has a long shadow, which may occur if the SAR imaging system uses a low depression angle (e.g., less than about 13 degrees), the target shadow 34' may be cut off (as shown in FIG. 3a) if the ATR system uses small square chips.

Figure 3B:
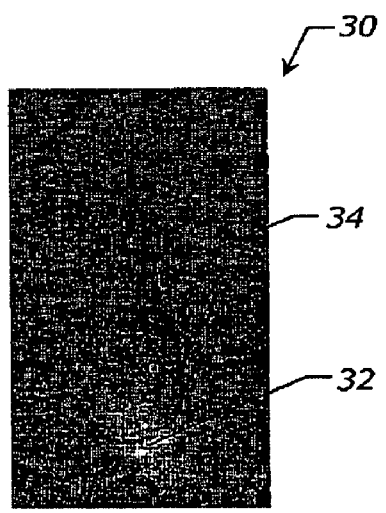
FIG. 3b is an example target chip having an elongated size and shape designed in accordance with an illustrative embodiment of the present invention.

In accordance with the present teachings, the ATR system 10 should sometimes use elongated non-square chips to ensure that the shadow information is captured in the target chips. FIG. 3b is an example target chip 30 having an elongated size and shape designed in accordance with an illustrative embodiment of the present invention. In the example, the chip 30 is a 256×128 pixel rectangle, with the target 32 located in the lower portion of the chip 30 so that the entire target shadow 34 is captured in the chip 30.

Figure 4A:
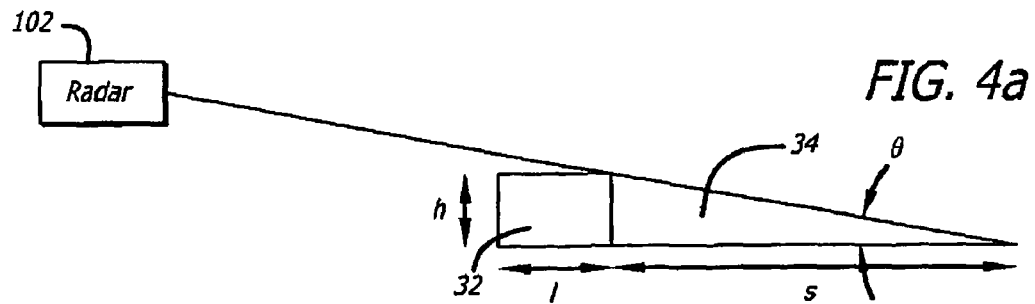
FIG. 4a is an illustration showing a side view of an illustrative imaging geometry.

The length of the shadow 34 is typically dependent on the depression angle of the imaging system and the height of the target 32. FIG. 4a is a diagram showing a side view of an illustrative imaging geometry. The imaging radar 102 transmits a radar signal at a depression angle θ. A target 32 having a target height h and a target length l (where h and l are in feet) produces a shadow 34 in the acquired radar image having a shadow length s given by (in number of pixels):

$$s = \frac{h}{p}\tan(\theta) \quad [1]$$

where p is the SAR image pixel spacing, which is typically about 0.75 ft per pixel.

Figure 4B:
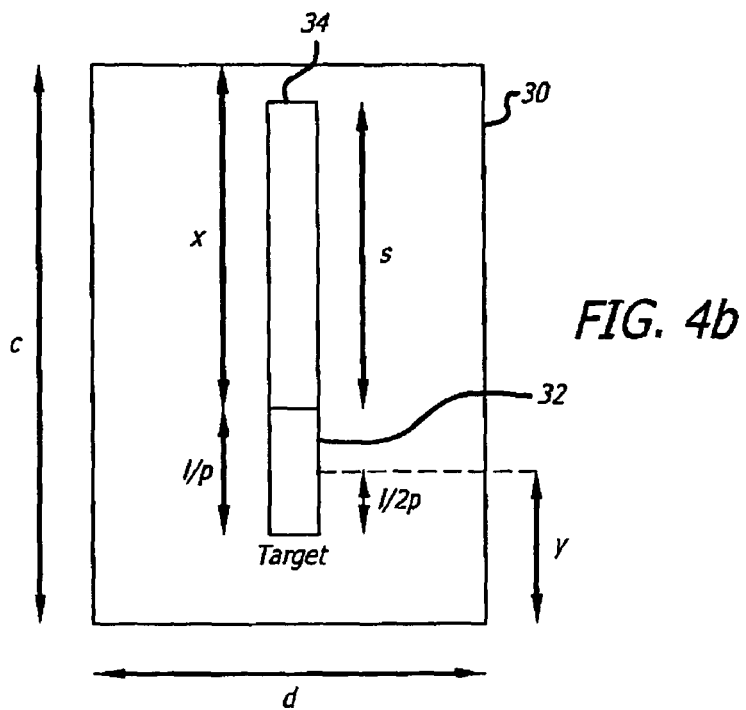

FIG. 4b is a diagram of an illustrative elongated target chip 30 designed in accordance with an illustrative embodiment of the present teachings, corresponding to the imaging geometry shown in FIG. 4a. The target chip 30 has a length c and a width d. In an illustrative embodiment, the chip width d is set to the width of the default square chip size (typically 128×128 pixels), and the chip length c is elongated to ensure capture of the entire shadow 34. The target 32 is positioned in the lower portion of the chip 30, with the center of the target 32 offset from the bottom edge of the chip 30 by some distance y. In an illustrative embodiment, the target offset y is set to half the default ship size d, such that the offset y in an elongated chip is the same as the offset in a square chip with a centered target. Thus, a default chip size of 128×128 pixels would result in an offset y=d/2=64 pixels for all chip sizes, square or elongated.

The distance x available in the chip 30 for a shadow 34 is the distance between the top of the target 32 and the top edge of the chip 30. The available shadow distance x (in number of pixels) is therefore given by:

$$x = c - \frac{l}{2p} - y \quad [2]$$

The chip length c should be chosen such that the available shadow distance x is greater than the shadow length s to ensure that the entire shadow 34 is captured in the target chip 30. Thus, the chip length c should be greater than:

$$c > \frac{h}{p}\tan(\theta) + \frac{l}{2p} + y \quad [3]$$

Returning to FIG. 1, the chip size selector 26 may be adapted to calculate the best chip size for each detected target to avoid cutting off a target shadow or, in a preferred embodiment, the chip size selector 26 may be adapted to select one of a predetermined number of chip sizes depending on the SAR imaging geometry. For example, in an illustrative embodiment, if the radar is using a depression angle equal to or greater than 13 degrees, the chip size selector 26 chooses a square 128×128 pixel chip size. If the depression angle is less than 13 degrees, the chip size selector 26 chooses a predetermined elongated chip size such as a 256×128 pixel chip that is long enough to capture the largest anticipated shadow length.

Even if the proper chip size is selected, a target chip may still cut off a shadow if the detected target is near the image edge. As shown in FIG. 2, target chips 30' that are not near the top image edge can be elongated as described above to include the entire target shadow. This option may not be available, however, for a target chip 30" that is located near the top image edge, where the entire shadow may not be present in the full-scene image 40.

In a preferred embodiment, the adaptive metric selector 20 also includes a cut-off shadow detector 28, which determines if a target chip might have a cut-off shadow due to proximity to the image edge. If the target chip would have a cut-off shadow (if a shadow was present), then the metric selector 24 should choose the relative amplitude metric, regardless of the results from the shadow detector 22. In an illustrative embodiment, the cut-off shadow detector 28 uses the radar depression angle, target data (target height, length, etc. from the ATC 12) and chip size of a target chip to determine it the chip would have a cut-off shadow. If yes, then the adaptive metric selector 20 can bypass the shadow detector 22 and instruct the metric selector 24 to choose the relative amplitude metric.

Figure 4C:
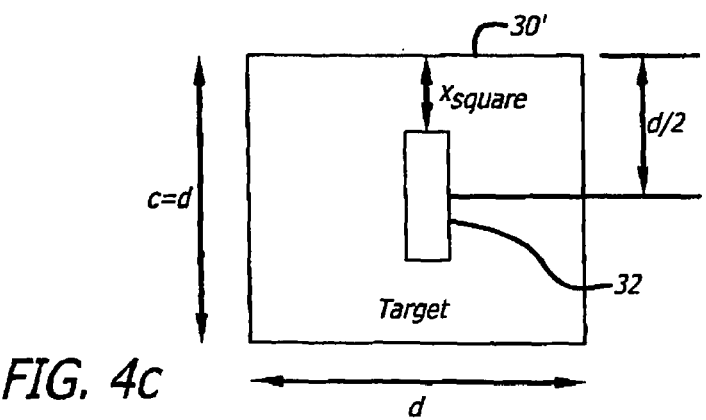
FIG. 4c is a diagram of an illustrative square target chip.

Target chips near the top image edge should use the default square chip size. FIG. 4c is a diagram of an illustrative square target chip 30' in which the chip 30' is centered over the center of the target 32 (i.e., the target 32 is offset by y=d/2). The chip 30' has a chip length c equal to its width d and the available shadow distance $x_{square}$ is given by (substituting c=d and y=d/2 in Eqn. 2):

$$x_{square} = \frac{d}{2} - \frac{l}{2p} \quad [4]$$

In an illustrative embodiment, the cut-off shadow detector 28 computes the estimated shadow length s (using, for example, Eqn. 1) and compares the shadow length s to the available shadow distance x in the target chip (using, for example, Eqn. 2 or Eqn. 4). If the estimated shadow length s is greater than the distance x available for a shadow, then the chip will have a cut-off shadow (when a shadow is present) and the metric selector 24 should choose the relative amplitude metric (regardless of the outcome from the shadow detector 22). Otherwise, the metric selector 24 uses the outcome of the shadow detector 22 to select the match metric (CLTS if a shadow is detected and relative amplitude if not).

The cut-off shadow detector 28 may be configured to process only the target chips near the image edge (since the other chips should not have cut-off shadows if the chip size is properly selected by the chip size selector 26), or it may be configured to process all of the target chips (which may be preferred if the target chips are a preset size and an unusually tall target may result in a cut-off shadow) or selected chips that are at risk of having cut-off shadows (such as chips from a SAR image with a small depression angle).

Figure 5:
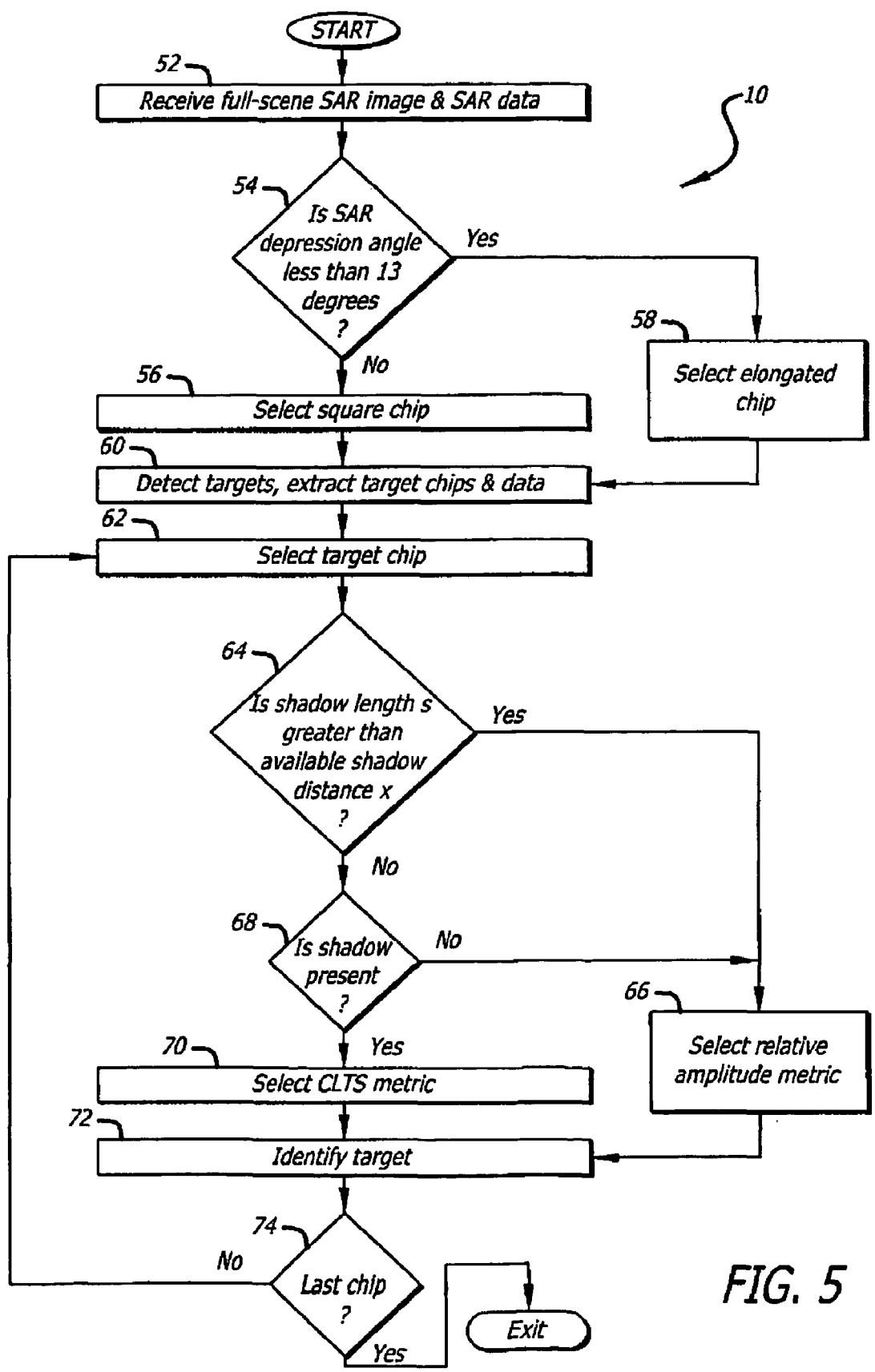
FIG. 5 is a flow diagram of an automatic target recognition system with adaptive metric selection designed in accordance with an illustrative embodiment of the present invention.

FIG. 5 is a flow diagram showing the operation of the illustrative automatic target recognition system 10 with adaptive metric selection shown in FIG. 1. First at Step 52, the ATR system 10 receives a full-scene SAR image and information about the imaging geometry such as the radar depression angle and pixel spacing.

Next, the chip size selector 26 (shown in FIG. 1) selects the size of the target chips based on the SAR depression angle used to acquire the image. At Step 54, the chip size selector 26 determines if the depression angle was less than some predetermined angle. (For example, in the illustrative embodiment of FIG. 5, the predetermined angle is 13 degrees. Other angles can also be used without departing from the scope of the present teachings.) If no, at Step 56, the chip size selector 26 selects the default square chip (for example, 128×128 pixels). If yes, at Step 58, the chip size selector 26 selects the preset elongated chip (for example, 256×128 pixels).

At Step 60, the automatic target cuer 12 searches for targets in the full-scene SAR image and outputs target chips of the size selected by the chip size selector 26 (unless the target chip is near the image edge, in which case the default square chip size is used) and associated target data, such as target length, height, and orientation.

Each target chip is then processed separately for identification. At Step 62, the adaptive metric selector 20 selects the first (or next) target chip. At Step 64, the cut-off shadow detector 28 determines if the estimated shadow length s (based on the target height h and SAR depression angle θ, see Eqn. 1) is greater than the available shadow distance x in the chip (based on the target length l and chip length c, see Eqn. 2). If yes, at Step 66, the metric selector 24 chooses the relative amplitude metric. Otherwise, at Step 68, the shadow detector 22 determines whether or not a shadow is present in the target chip. If yes, at Step 70 the metric selector 24 chooses the CLTS metric; otherwise, at Step 66 the metric selector 24 chooses the relative amplitude metric.

At Step 72, the matcher 14 identifies the target by comparing the target chip with various target classes pre-stored in a database using the match metric selected by the metric selector 24. At Step 74, if there are additional target chips to identify return to Step 62 and select the next target chip. The adaptive metric selection and target identification processes are repeated until all of the detected targets are identified.

In an illustrative embodiment, the adaptive metric selector 20 and ATR system 10 of the present invention are implemented in software executed by a microprocessor. The streamlined end-to-end ATR architecture of the present invention can be readily parallelized in current commercial off-the-shelf processors, in which case steps 62 through 72 can be performed in parallel for multiple chips. Other implementations may also be used without departing from the scope of the present teachings. For example, the adaptive metric selector 20 and ATR system 10 may also be implemented using discrete logic circuits, FPGAs, ASICs, etc.

Thus, the present invention provides an adaptive means for selecting the match metric of an ATR system on a chip-by-chip basis in a SAR image. The metric selection is not based on a prior knowledge of the SAR depression angle as in conventional ATR systems, but based on scene content. In the preferred embodiment, the optimal metric determination is made outside of the typically computation-intensive matcher processing, allowing the target chip, selected match metric and other parameters to be passed to the matcher via a convenient interface.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An automatic target recognition system comprising:
    first means for selecting a match metric based on the presence or absence of a particular feature in an image; and
    second means for identifying a target in said image using said selected match metric, wherein said feature is a shadow, wherein said first means includes means for detecting a shadow in said image, and wherein said first means further includes fourth means for determining whether said image might have a cut-off shadow.

2. The system of claim 1 wherein said first means includes means for selecting a first metric when a shadow is detected and said fourth means determines that said image does not have a cut-off shadow, and selecting a second metric otherwise.

3. The system of claim 2 wherein said fourth means includes means for calculating an estimated shadow length.

4. The system of claim 3 wherein said fourth means further includes means for calculating a distance in said image available for said shadow.

5. The system of claim 4 wherein said fourth means determines that said image might have a cut-off shadow when said estimated shadow length is greater than said available shadow distance.

6. An adaptive metric selector for an automatic target recognition system comprising:
    a shadow detector adapted to detect the presence of a shadow in an image; and
    a metric selector adapted to select a match metric based on whether or not a shadow is detected, wherein said adaptive metric selector further includes a cut-off shadow detector for determining whether said image might have a cut-off shadow.

7. The adaptive metric selector-of claim 6, wherein said metric selector is adapted to select a first metric when said shadow detector detects a shadow and said cut-off shadow detector determines that said image does not have a cut-off shadow, and select a second metric otherwise.

8. The adaptive metric selector of claim 7 wherein said first metric is a classification level test statistic metric.

9. The adaptive metric selector of claim 8 wherein said second metric is a relative amplitude metric.

10. The adaptive metric selector of claim 7 wherein said cut-off shadow detector is adapted to calculate an estimated shadow length.

11. The adaptive metric selector of claim 10 wherein said cut-off shadow detector is adapted to calculate a distance in said image available for said shadow.

12. The adaptive metric selector of claim 11 wherein said cut-off shadow detector determines that said image might have a cut-off shadow when said estimated shadow length is greater than said available shadow distance.

* * * * *